United States Patent [19]

Galand et al.

[11] Patent Number: 5,031,218
[45] Date of Patent: Jul. 9, 1991

[54] REDUNDANT MESSAGE PROCESSING AND STORAGE

[75] Inventors: Claude Galand, Cagnes Sur Mer, France; Daniel T. Lai, Fremont; Michael E. Locke, Santa Clara, both of Calif.

[73] Assignee: International Business Machines Corporation, Armonk, N.Y.

[21] Appl. No.: 496,127

[22] Filed: Mar. 19, 1990

Related U.S. Application Data

[63] Continuation of Ser. No. 175,807, Mar. 30, 1988, abandoned.

[51] Int. Cl.⁵ .............................................. G10L 5/00
[52] U.S. Cl. ......................................... 381/46; 360/32; 360/48; 371/2.2; 371/31
[58] Field of Search ...................... 381/46; 360/32, 48; 371/31, 2.2, 40.1

[56] References Cited

U.S. PATENT DOCUMENTS

| | | | |
|---|---|---|---|
| 2,843,676 | 7/1958 | Halliday | 179/100.2 |
| 2,941,032 | 6/1960 | Geiger | 178/6.6 |
| 2,944,113 | 7/1960 | Wehde | 179/15.55 |
| 3,303,482 | 2/1967 | Jenkins | 340/174.1 |
| 3,371,157 | 2/1968 | Bushway | 178/6.6 |
| 3,412,214 | 11/1968 | Gabor | 179/100.2 |
| 3,412,218 | 11/1968 | Comerci | 179/100.2 |
| 3,685,021 | 8/1972 | Mauch | 340/172.5 |
| 3,836,735 | 9/1974 | Bradley | 179/175.3 R |
| 4,068,258 | 1/1978 | Bied-Charreton | 358/4 |
| 4,156,256 | 5/1979 | Obremski | 360/22 |
| 4,224,642 | 9/1980 | Mawatari et al. | 360/32 |
| 4,288,801 | 9/1981 | Ronen | 357/41 |
| 4,375,083 | 2/1983 | Maxemchuk | 364/900 |
| 4,392,162 | 7/1983 | Yamamoto | 360/10.3 |
| 4,463,387 | 7/1984 | Hashimoto et al. | 358/310 |
| 4,518,827 | 5/1985 | Sagara | 179/81 R |
| 4,549,047 | 10/1985 | Brian et al. | 179/18 B |
| 4,622,598 | 11/1986 | Doi et al. | 360/22 |
| 4,651,230 | 3/1987 | Hagita et al. | 358/314 |
| 4,685,004 | 8/1987 | Takahashi et al. | 360/48 |
| 4,688,224 | 8/1987 | Degan | 381/46 |
| 4,697,212 | 9/1987 | Osawa | 360/32 |
| 4,710,960 | 12/1987 | Sato | 381/47 |
| 4,763,293 | 8/1988 | Takei | 371/31 |

OTHER PUBLICATIONS

R. G. Carlgren, "Minimum Redundancy Parts-Of-Speech Data Storage Technique", Apr. 1984, p. 6083, IBM Technical Disclosure Bulletin.
IBM Corporation, System/88, 1987, Architectural Overview, /Copy attached.
Analog Devices, /copy attached.

*Primary Examiner*—Emanuel S. Kemeny
*Attorney, Agent, or Firm*—Blakely, Sokoloff, Taylor & Zafman

[57] ABSTRACT

A method for dividing a message into a plurality of message blocks and storing each of the plurality of message blocks on separate units within a distributed data storage system. Facilities for retrieving the information from the distributed data storage system and recreating the original message for replay are also provided. If a unit within the distributed data storage system fails, then a degraded version of the original message is recreated from the remaining units and their stored message blocks.

20 Claims, 2 Drawing Sheets

REDUNDANT MESSAGE PROCESSING AND STORAGE

This is a continuation application Ser. No. 175,807 filed Mar. 30, 1988 now abandoned.

BACKGROUND OF THE INVENTION

1. Field of the Invention

This invention generally relates to improvements in the processing and storage of voice messages. Specifically, a voice message is split into a plurality of message blocks and stored on individual data storage devices. By recording the message on a plurality of data storage devices, if one or more of the data storage devices are unavailable, the other devices are used to reform the message in an intelligible form. During normal processing, the voice message is retrieved from all of the data storage devices and merged to reform the original voice message.

2. Description Of The Prior Art

The past several years have seen the exploitation of digital switch capabilities, particularly the ability to multiplex voice and data through the switch. A natural extension of this capability was the development of a mailbox capability for a user's telephone. This capability allowed much of the written correspondence associated with daily interaction to be replaced with voice communication stored and accessible from a person's phone.

A necessary feature of a voice mailbox system was a facility to store and retrieve a voice message. An example of a digitized voice message storage system is found in U.S. Pat. No. 4,549,047, to Brian et al., issued Oct. 22, 1985. The patent discloses a digital voice processing system that converts analog telephone signals into digital data which the system uses for message storage. The system has two levels of storage. A random access memory is used to temporarily store the messages, and a mass storage system is used to retain the messages for longer periods of time.

There are various limitations of the disclosed method. First, the messages are stored in a single location in the random access memory or mass storage system. This means that a single parity error, surface defect or other memory fault can distort or even destroy a message. Second, the messages are stored on a single memory subsystem. This means that a hardware problem can temporarily or permanently postpone recovery of a message.

Another approach for recording analog audio signals is to convert the analog samples into coded pulse groups as disclosed in U.S. Pat. No. 4,224,642, to Mawatari et al., issued Sept. 23, 1980. The patent discusses a technique for recording and reproducing analog audio signals and compensating for dropout errors induced by the recording medium. The successive pulse groups are recorded on different regions of a magnetic tape. To replay the messages, the pulse groups are reconverted into electrical signals from the recording medium and rearranged into the original order. While this technique allows some errors in the recording medium to be overcome, the sequential recall of information stored on a tape would make retrieval of randomly stored messages difficult. Also, the use of a single tape leaves the system subject to the loss of information resulting from a tape failure.

Another technique for pulse code modulation (PCM) signal recording is disclosed in U.S. Pat. No. 4,622,598, to Doi et al., issued Nov. 11, 1986. The disclosed method distributes the input PCM signals and records them so that one-channel PCM signals are recorded on a plurality of recording tracks. The words are encoded as a function of whether the input word numbers are even or odd, and the words thus separated are subjected to time delays or interleaving operations, after which the odd and even numbered words are recorded. This technique provides adequate protection against single track errors by distributing the signal over multiple recording tracks, but there is no capability provided for avoiding a unit failure.

An article entitled, "Minimum Redundancy Parts-Of-Speech Data Storage Technique", IBM Technical Disclosure Bulletin, Vol. 26, No. 11, April 1984, p. 6083 discloses a technique to reduce the storage necessary to store the basic parts of speech in a dictionary word list. This technique is similar to other compression algorithms that reduce the storage necessary for saving a digital message on a data storage device. None of the compression techniques provides a means for fractionalizing the original message and storing it on a plurality of data storage devices to allow the reformation of the original message from the divided original.

High availability systems that have an absolute requirement to conserve data storage space use techniques like that employed in the IBM System/88. The IBM System/88 has a pair of processors which automatically duplex each write operation to dual data storage devices. This technique, while effective for specialized data processing operations, is unacceptable for voice mailbox operations where data storage space is critical.

While the prior art discusses methods for distributing analog information on a single recording medium to decrease the effects of defects in the recording medium and the use of duplexed information to remedy failures in one of the copies, the prior art has no solution to the problem that our invention addresses.

SUMMARY OF THE INVENTION

It is therefore an object of this invention to provide improved availability of data with no additional storage requirements.

It is a further object of the invention to fractionalize the data into a plurality of data blocks and store the plurality of data blocks on a plurality of data storage devices.

It is another object of the invention to improve the fidelity of the restored message by recreating the message from as many of the data blocks as possible.

It is yet another object of the invention to provide increased availability of stored messages in a network of data storage devices.

It is still another object of the invention to provide intelligible recreation of the original message when one or more of the data blocks cannot be retrieved.

According to the invention, these objects are accomplished by splitting the data into a set of blocks and storing the blocks on a plurality of data storage devices. The data is restored by retrieving as many of the stored blocks from the data storage devices as possible. The stored blocks that are not able to be retrieved from the data storage device are recreated by interpolation or other approximation technique. The data storage devices can be attached to the local bus or distributed in a network environment, and additional data storage devices can be added to further distribute the data and limit the adverse effect of a single data storage device failure.

BRIEF DESCRIPTION OF THE DRAWINGS

The foregoing and other objects, aspects and advantages of the invention will be better understood from the following detailed description of the preferred embodiment of the invention with reference to the accompanying drawings, in which.

DESCRIPTION OF THE PREFERRED EMBODIMENT OF THE INVENTION

Figure 1:
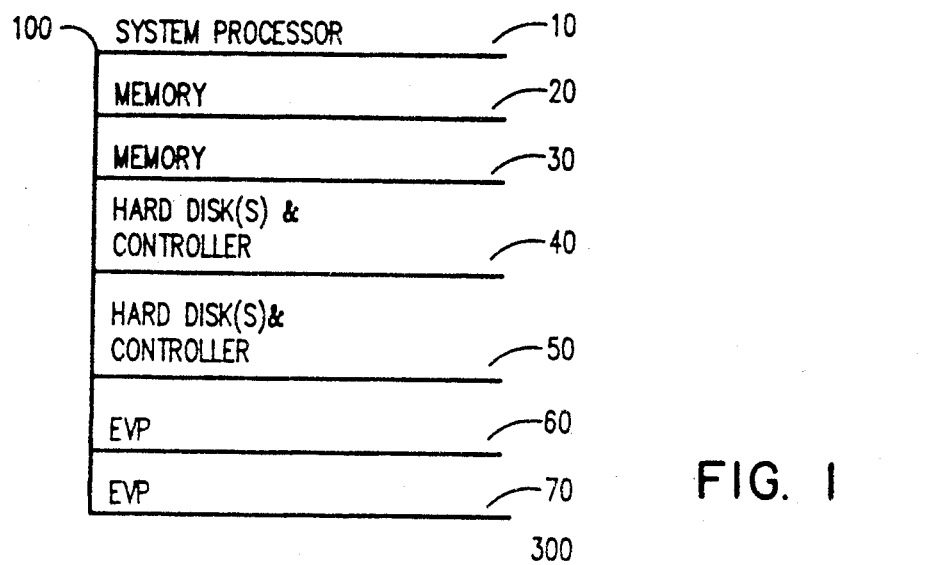
FIG. 1 is an illustration of the board layout of the voice processing system in accordance with the present invention.

The subject invention is disclosed by reference to a voice messaging system marketed by the International Business Machines Corporation. Referring now to the figures, and more particularly to FIG. 1, a board layout diagram is provided representative of the voice messaging system. A system processor 10 plugs into the backplane of the system bus 100 to communicate with the other system boards. A pair of memory boards 20 and 30 provide up to four megabytes of system memory. A set of hard disks and controllers 40 and 50 provide up to eight disk drives. Also, a pair of enhanced voice processor cards (EVP) 60 and 70 are provided. Each of these cards have a programmable digital signal processor which perform various duties including the subband voice encoding of the voice message.

Figure 2:
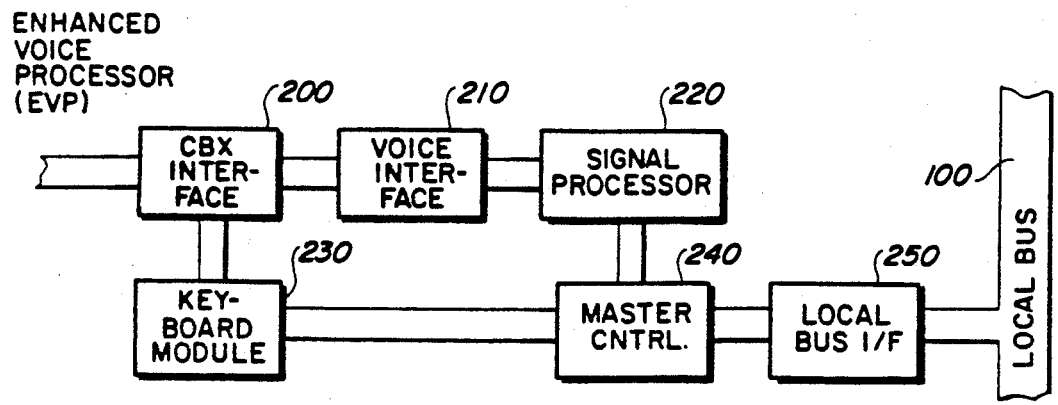
FIG. 2 is a block diagram of the enhanced voice processor card used to process voice and tones in the present invention.

FIG. 2 provides a block diagram of the EVP. Voice messages come into the card via the computerized branch exchange (CBX) interface 200. The voice interface 210 buffers several samples so that the signal processor can process the samples as a group. The signal processor 220 performs several functions including the detection of Dual Tone Multifrequency (DTMF) signals. A master controller 240 consists of an Intel 80186 processor. It splits the message from the signal processor into blocks of data and stores each data block on one of the eight disk drives shown at 40 and 50 of FIG. 1. The keyboard module 230 processes keyboard commands and sends them to the CBX via the CBX interface 200.

The signal processor 220 is a general purpose digital signal processor of the type described in "DSP PRODUCTS DATABOOK", *Analog Devices, Inc.*, 1987 and "TMS320C25 User's Guide", *Texas Instruments, Inc.*, 1986. The discussion in chapter 2 of the TMS320C25 User's Guide will be helpful in understanding the architecture and instruction set of a signal processor.

Digital signal processing of the buffered samples takes place in the signal processor 220. The sampling takes place at the industry standard rate of eight thousand samples per second. Filtering of the original signal is followed by a subband coding process which consists of filtering the message into narrow bands of information that cover the frequency range of interest.

The output of the filtering process is sampled and quantized to form the encoded message and stored in message blocks. Recreation of the message from a single message block is accomplished by processing each message block by the subband coder filter bank.

Interpolation between a single or multiple lost message blocks could be substituted for the double subband coder processing described above. Also, time domain harmonic scaling, linear predictive coding, adaptive predictive coding or complex subband encoding with interpolation between skipped blocks could be substituted for the subband coder filter bank described above.

Functional Processing

Figure 3A:
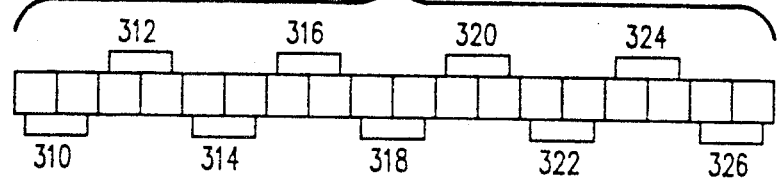
FIG. 3A to 3C form an illustration of a sample configuration of the present invention.
Figure 3B:
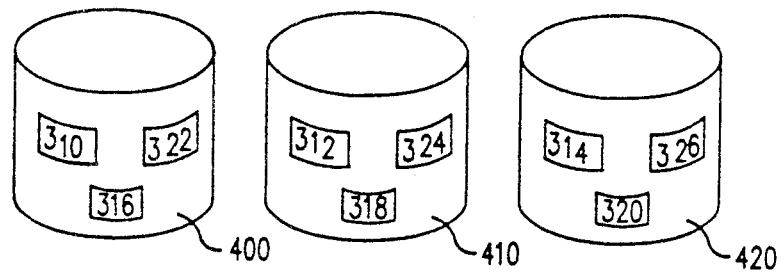
Figure 3C:
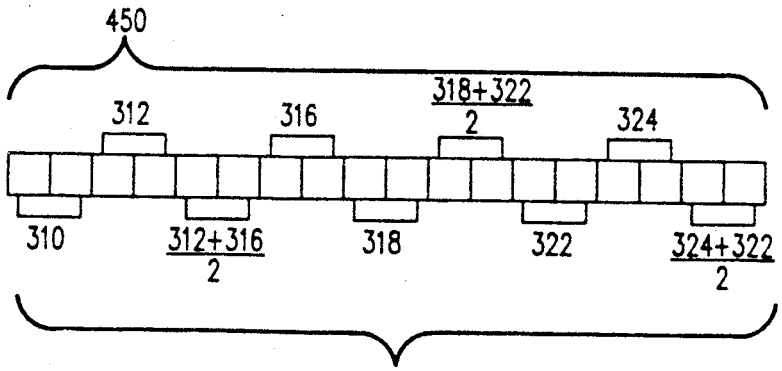

A simple example should help to clarify the message processing. FIG. 3 is an illustration of a sample configuration which includes an input message 300; a plurality of data storage devices 400, 410 and 420; and a recreated message 450. The example assumes that the message 300 is split into blocks: 310, 312, 314, 316, 318, 320, 322, 324 and 326. The blocks are alternately stored on data storage device 400, 410 and 420 as illustrated.

The example assumes that data storage device 420 is lost due to power failure, head crash or other destructive event. The recreated message 450 is restored from data storage devices 400 and 410. The blocks that are available are restored in their entirety as shown in 450. However, every third block must be recreated from the available surrounding blocks as represented in the simple mean value operation that is shown in FIG. 3. For example, the first missing block 314 is recreated by averaging blocks 312 and 316.

Figure 4:
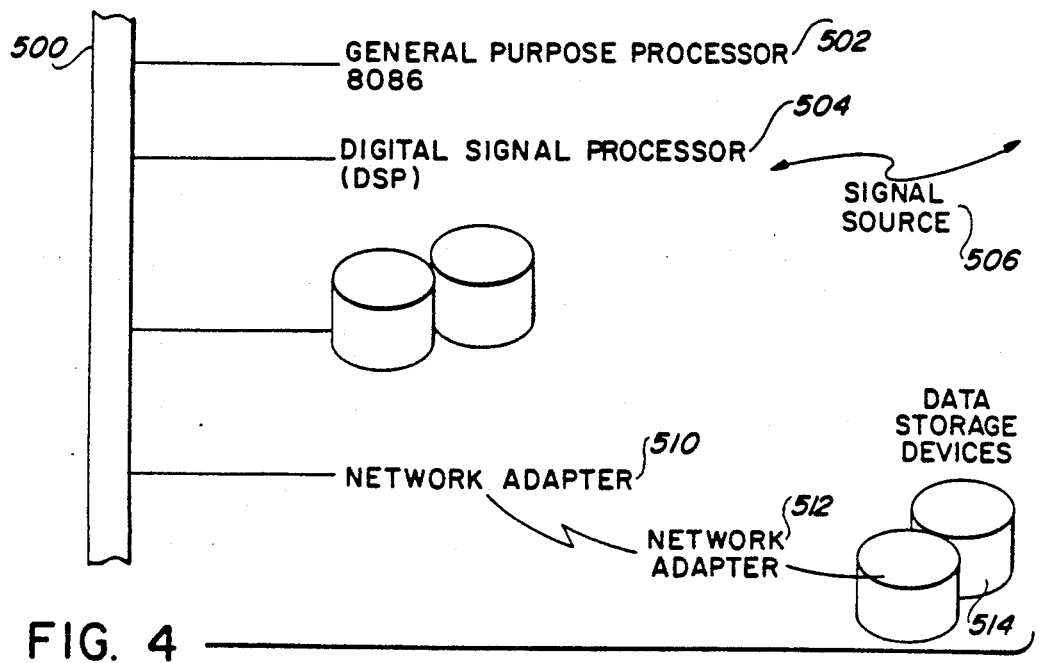
FIG. 4 is an illustration of an alternate configuration of the present invention.

Time domain scaling, subband coding or other compression methods could be substituted for the trivial alternate saving of blocks employed in the example. Also, the data storage devices could be supported via a network to distribute the storage processing and further reduce the cost of data storage by sharing the resources between systems as shown in FIG. 4. Additional data storage devices will increase the fidelity of the recreated message in the event of one or more failures of data storage devices. All of the blocks of the split message will be used when the system functions normally.

Program Logic

The detailed logic of the invention is shown in a listing of the C code. The C code is compiled and executes on a general purpose processor. One of ordinary skill in the art could translate the C implementation of the program logic into another language without undue experimentation.

/*

(c) Copyright International Business Machines Corporation 1987, All Rights Reserved The program is invoked with the following procedure call:
SKIP INFILE OUTFILE KEEP#FRAME DUP#FRAME SKIP#FRAME WHERE:
| | |
|---|---|
| (1) | INFILE is a pointer to the input, digital message datastream |
| (2) | OUTFILE is the output file pointer. |
| (3) | KEEP#FRAME indicates the frame to keep |
| (4) | DUP#FRAME is the number of times the frame is duplicated in the stored message. |
| (5) | SKIP#FRAME is the number of frames to disregard |

```
                in the original frame when creating the stored
                message.
*/
#include <stdio.h>
#define FRAMESIZE 9         /* 9 lines of msg/frame */
char buf[FRAMESIZE][80[;    /* keep up to FRAMESIZE
                               lines of input */
char tmpbuf[80];            /* used by skip frame */
FILE *infile;               /* input file pointer */
FILE *outfile;              /* output file pointer */
     main (argc, argv)
     int argc;
     char *argv[];
     {
     int i-keep, dup, skip;
     if ( argc ! = 6) {
     printf("Usage: skip infile outfile keep#frame
     dup#frame skip#frame
     n");
     exit(-5);
     }
     if ((infile = fopen (argv[1], þr")) = = NULL) {
     /* open input file */
     printf("cannot open %s
     n", argv[1]);
     exit(-1);
     }
     if ((outfile = fopen (argv[2], "w")) = = NULL) {
     /* open output file */
     printf("cannot open %s
     n", argv[2]);
     exit(-2);
     }
     keep = atoi (argv[3]); /* # of frames to keep */
     dup = atoi (argv[4]);
     /* # of frames to replicate */
     skip = atoi (argv[5]); /* # of frames to skip */
     for (;;) { /* LOOP FOREVER */
     /* Save "KEEP" frames */
     for (i = 0; i < keep; i++)
     keep-frame();
     /* Repeat "DUP" frames */
     for (i = 0; i < dup; i++)
     dup-frame();
     /* Repeat "SKIP"frames */
     for (i = 0; i < skip; i++)
     skip-frame();
     }
     }
     /*
     Keep this frame -- put in the output file
     and store in the buffer for replication
     by dup-frame()
     */
     keep-frame()
     {
     int i;
     for (i = 0; i < FRAMESIZE; i++) {
     if (fgets(buf[i], 80, infile) = = NULL) {
     exit(-9); /* End of the input file */
     }
     fprintf(outfile, "%s", buf[i]);
     }
     }
     /*
     duplicates the last frame that was processed by
     keep-frame(), put this frame into the output
     file
     */
     dup-fram()
     {
     int i;
     for (i = 0; i < FRAMESIZE; i++) {
     fprint(outfile, "%s", buf[i]);
     }
     }
     /*
     skip this frame -- read in from the input.file
     but do not put into the output file
     */
     skip-frame()
     {
```

```
     int i;
     for i = 0; i < FRAMESIZE; i++) {
     if (fgets < tmpbuf, 80, infile) = = NULL) {
     exit (-9); /* input file end */
     }
     }
     }
```

Referring to FIG. 4, an alternate hardware environment is shown. The system bus 500 has a general purpose processor (8086) 502 that executes the program logic discussed above. It receives the processed message from the digital signal processor (DSP) 504. The DSP filters the signal source 506, detects dial tones (dual tone multifrequency signals (DTMF)) and passes the information to the general purpose processor 502 which compresses the information and splits the compressed message into message blocks which are disseminated to the data storage devices locally 508 and remotely 514 via the network adapters 510 and 512. The network adapters can be chosen to accommodate the user's environment and choice of networks.

Figure 5:
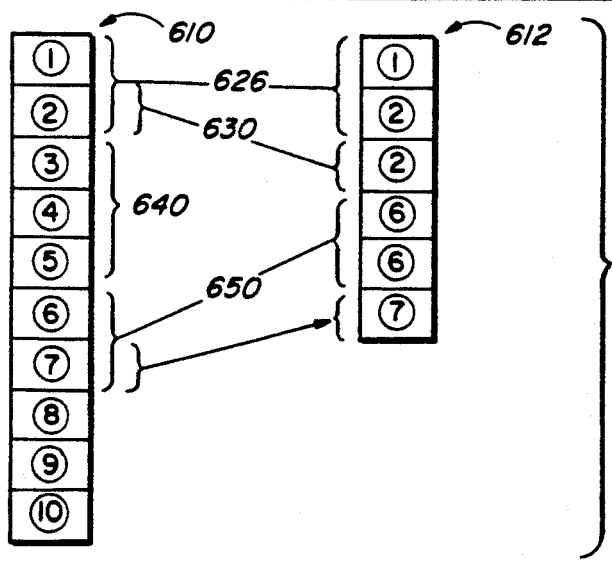
FIG. 5 is an illustration of a sample message processed by the present invention.

To clarify the processing of the program in the general purpose processor, an example is provided in FIG. 5. Considering FIG. 5, the input message buffer is pointed to by INFILE#PTR 600. INFILE#PTR initially contains the address of the input message buffer. In the example, the input message buffer contains the values shown in FIG. 5. The output buffer is addressed similarly by OUTFILE#PTR 610. If the program logic is invoked by the following call:
SKIP INFILE#PTR, OUTFILE#PTR, 2, 1, 3

KEEP#FRAME, DUP#FRAME and SKIP#FRAME are initialized to two, one and three, and the processing proceeds as follows:

(1) At label 620, the first two blocks from the input message buffer are transferred to the output message buffer under the control of KEEP#FRAME equal to two.

(2) At label 630, the last block moved from the input message buffer is transferred to the output message buffer under the control of DUP#FRAME equal to one.

(3) At label 640, the next three blocks of the input message buffer are skipped under the control of SKIP#FRAME equal to three.

(4) At label 650, steps one, two and three are repeated until the end of the input message buffer are exhausted.

While the invention has been described in terms of a preferred embodiment in a specific environment, those skilled in the art will recognize that the invention can be practiced, with modification, in other and different environments within the spirit and scope of the appended claims.

Having thus described our invention, what we claim as new and desire to secure by Letters Patent is set forth in the following claims;

1. A method for storing a voice message on a plurality of physically separate data storage devices and recreating the message from the information stored on the plurality of data storage devices, comprising:

(a) splitting the message into a plurality of message blocks;

(b) storing predetermined ones of the plurality of message blocks on predetermined ones of the plurality of data storage devices; and (c) recreating the message from storage devices, and if at least one of said plurality of storage devices becomes unavailable, recreating the message at a fidelity lower than the fidelity recreated when all of said storage devices are available.

2. A method for storing a message on a plurality of data storage devices and recreating the message from the information stored on one or more of the plurality of data storage devices as recited in claim 1, wherein said plurality of message blocks are stored on at least three data storage devices to minimize the effects of a data storage device failure.

3. A method for storing a message on a plurality of data storage devices and recreating the message from the information stored on one or more of the plurality of data storage devices as recited in claim 1, wherein the message is recreated by:
(a) retrieving the message blocks from all functioning data storage devices;
(b) interpolating any missing message blocks from the available message blocks; and
(c) reforming the message from the retrieved message blocks and the interpolated message blocks.

4. A method for storing a message on a plurality of data storage devices and recreating the message from the information stored on one or more of the plurality of data storage devices as recited in claim 1, wherein any missing message blocks are recreated by processing the available message blocks by a coder bank.

5. A method for storing a message on a plurality of data storage devices and recreating the message from the information stored on one or more of the plurality of data storage devices as recited in claim 1, wherein said plurality of data storage devices are accessed through a network.

6. A method for storing a message on a plurality of data storage devices and recreating the message from the information stored on one or more of the plurality of data storage devices as recited in claim 1, wherein said plurality of data storage devices are accessed locally.

7. A method for storing a message on a plurality of data storage devices and recreating the message from the information stored on one or more of the plurality of data storage devices as recited in claim 1, wherein the message blocks are duplicated on individual data storage devices to minimize the effects of a data storage device failure.

8. A method for storing a message on a plurality of data storage devices and recreating the message from the information stored on one or more of the plurality of data storage devices as recited in claim 1, wherein at least two of the message blocks are not stored on any of said plurality of a data storage devices to decrease the amount of storage required.

9. A method for storing a message on a plurality of data storage devices and recreating the message from the information stored on one or more of the plurality of data storage devices as recited in claim 1, wherein the message is first compressed to decrease the amount of storage required.

10. A method for storing a message on a plurality of data storage devices and recreating the message from the information stored on one or more of the plurality of data storage devices as recited in claim 1, further comprising the steps of:
(a) splitting the message into a pair of message blocks;
(b) storing the pair of message blocks on a pair of data storage devices; and
(c) recreating the message from one or both of the message blocks stored on the pair of data storage devices.

11. Apparatus for storing a message on a plurality of data storage devices and recreating the message from the information stored on the plurality of data storage devices, comprising:
(a) means for splitting the message into a plurality of message blocks;
(b) means for storing predetermined ones of the plurality of message blocks on predetermined ones of the plurality of data storage devices; and
(c) means for recreating the message from the plurality of message blocks stored on the plurality of data storage devices and if at least one of said plurality of storage devices becomes unavailable, recreating the message at a fidelity lower than the fidelity recreated when all of said storage device are available.

12. The apparatus for storing a message on a plurality of data storage devices and recreating the message from the information stored on one or more of the plurality of data storage devices as recited in claim 11, further comprising means for storing said plurality of message blocks on at least three data storage devices to minimize the effects of a data storage device failure.

13. The apparatus for storing a message on a plurality of data storage devices and recreating the message from the information stored on one or more of the plurality of data storage devices as recited in claim 11, including:
(a) means for retrieving the message blocks from all functioning data storage devices;
(b) means for interpolating any missing message blocks from the available message blocks; and
(c) means for reforming the message from the retrieved message blocks and the interpolated message blocks.

14. The apparatus for storing a message on a plurality of data storage devices and recreating the message from the information stored on one or more of the plurality of data storage devices as recited in claim 4, further comprising means for recreating any missing message blocks by processing the available message blocks by a coder bank.

15. The apparatus for storing a message on a plurality of data storage devices and recreating the message from the information stored on one or more of the plurality of data storage devices as recited in claim 11, further comprising means for networking the plurality of data storage devices.

16. The apparatus for storing a message on a plurality of data storage devices and recreating the message from the information stored on one or more of the plurality of data storage devices as recited in claim 11, further comprising means for accessing the plurality of data storage devices locally.

17. The apparatus for storing a message on a plurality of data storage devices and recreating the message from the information stored on one or more of the plurality of data storage devices as recited in claim 11, further comprising means for duplicating the message blocks to minimize the effects of a data storage device failure.

18. The apparatus for storing a message on a plurality of data storage devices and recreating the message from the information stored on one or more of the plurality of data storage devices as recited in claim 11, further comprising means for discarding at least two of the message blocks to decrease the amount of storage required.

19. The apparatus for storing a message on a plurality of data storage devices and recreating the message from the information stored on one or more of the plurality of data storage devices as recited in claim 11, further comprising means for compressing the message to decrease the amount of storage required.

20. The apparatus for storing a message on a plurality of data storage devices and recreating the message from the information stored on one or more of the plurality of data storage devices as recited in claim 11, further comprising:
(a) means for splitting the message into a pair of message blocks;
(b) means for storing the pair of message blocks on a pair of data storage devices; and
(c) means for recreating the message from one or both of the message blocks stored on the pair of data storage devices.

* * * * *

UNITED STATES PATENT AND TRADEMARK OFFICE
CERTIFICATE OF CORRECTION

PATENT NO. : 5,031,218
DATED : July 9, 1991
INVENTOR(S) : Galand et al.

It is certified that error appears in the above-indentified patent and that said Letters Patent is hereby corrected as shown below:

Column 7, line 1, after "from", insert --the plurality of message blocks stored on the plurality of data--.

Signed and Sealed this

Twenty-third Day of May, 1995

Attest:

BRUCE LEHMAN

*Attesting Officer*    *Commissioner of Patents and Trademarks*